No. 720,290. PATENTED FEB. 10, 1903.
L. SKAIFE.
CATCH BASIN.
APPLICATION FILED SEPT. 18, 1900.
NO MODEL.
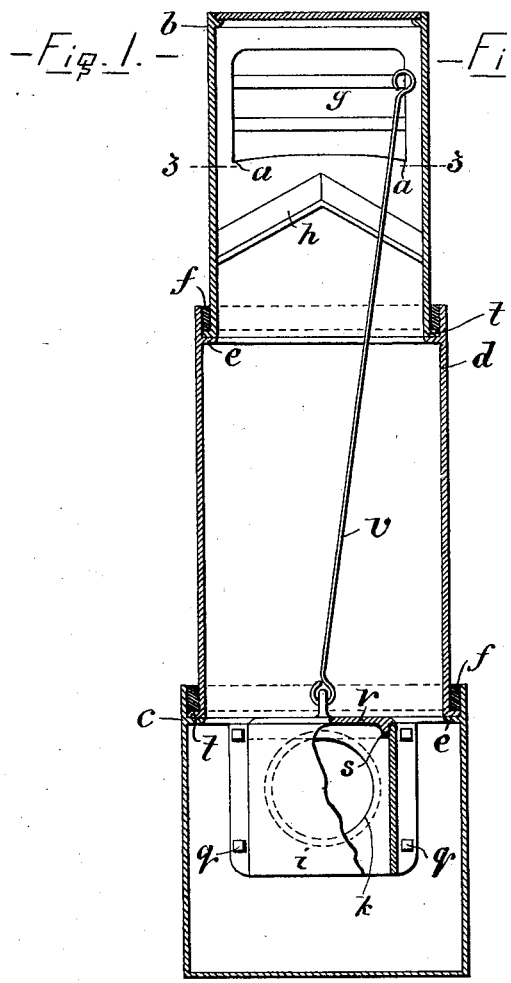
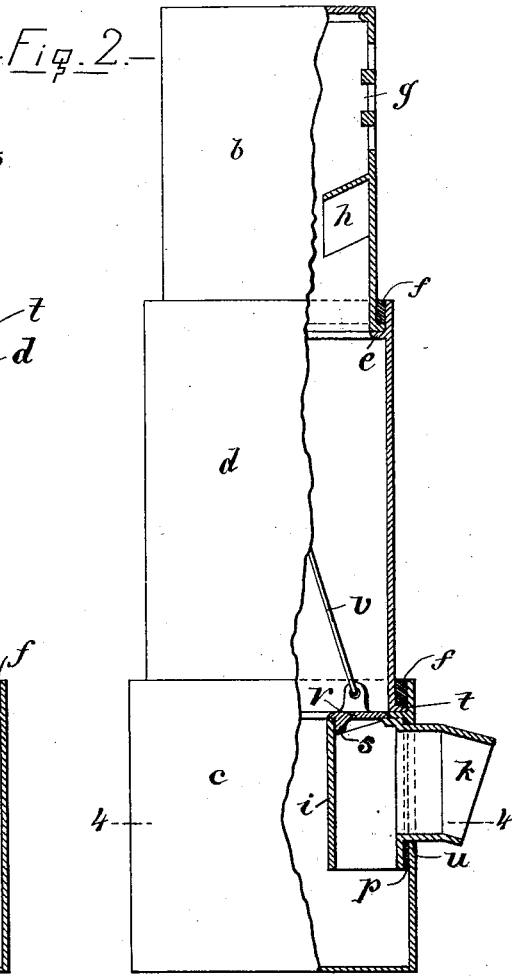
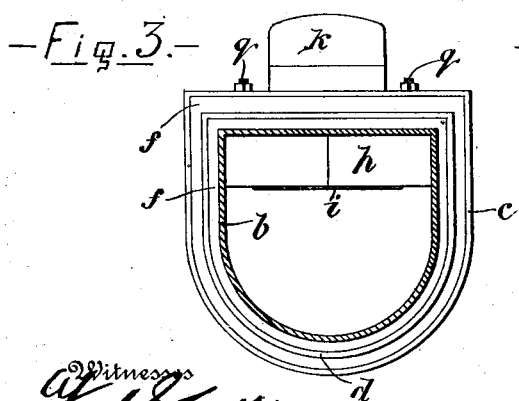
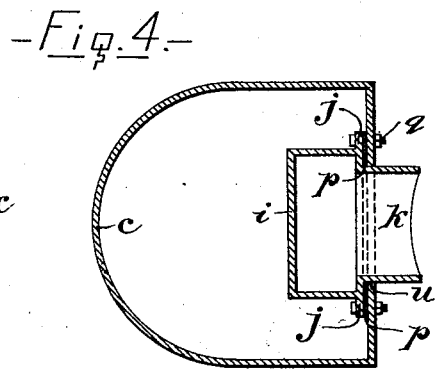
LEWIS SKAIFE, Inventor
By his Attorney

UNITED STATES PATENT OFFICE.

LEWIS SKAIFE, OF MONTREAL, CANADA.

CATCH-BASIN.

SPECIFICATION forming part of Letters Patent No. 720,290, dated February 10, 1903.

Application filed September 18, 1900. Serial No. 30,444. (No model.)

*To all whom it may concern:*

Be it known that I, LEWIS SKAIFE, of the city of Montreal, in the district of Montreal and Province of Quebec, Canada, have invented certain new and useful Improvements in Catch-Basins; and I do hereby declare that the following is a full, clear, and exact description of the same.

The invention may be said briefly to consist in providing a top section of any approved construction, an intermediate section of greater transverse area than and receiving the lower end of said top section, and a bottom section (communicating, as usual, with the sewer) of greater transverse area than and receiving the lower end of the intermediate section, thus providing a catch-basin of downwardly-increasing transverse area and variable in length. A deflector is provided above the trap and preferably a short distance below the inlet-opening, the function of this deflector being to deflect the water to run down the sides of the gully, thereby preventing the coating of the trap by ice in cold weather. The trap is secured firmly to its carrying-section and has the sewer connection cast in one therewith, thus obviating any chance of leakage of poisonous gases from the sewer to the gully, while the top of said trap is open throughout its area and provided with a flanged cover to serve the double purpose of allowing said trap to be thoroughly cleansed by a scraper after the cover is removed and when the cover is in place prevent leakage from the trap. The gully is of D cross-section, and the top, with the street-opening, is cast in one with the top section, while the joints are each adapted to receive cement, lead, or other sealing substance, and the whole provides a gully without any interior protuberances other than the trap and deflector and that will be proof against damage by frost and enable catch-basins of any desired depth to be made.

For full comprehension, however, of my invention reference must be had to the accompanying drawings, forming a part of this specification, in which like symbols indicate the same parts, and wherein—

Figures 1 and 2 are vertical sectional views taken at right angles to one another of my improved catch-basin; and Figs. 3 and 4 are horizontal sectional views taken on lines 3 3 and 4 4, Figs. 1 and 2, respectively.

The top $b$ of the catch-basin is cast in one with the top section, and said top section and the bottom and middle sections $c$ and $d$, respectively, are of D cross-section.

In constructing my improved catch-basin I prefer to use only one intermediate section $d$, (although two or more can be used, if desired,) and it and the bottom section $c$ are each formed on the interior and near the top thereof with an annular shoulder $e$ to support the superimposed top and intermediate sections, while the transverse area of each section is sufficiently greater than the one it supports to provide a space for cement $f$ or other joint-sealing substance.

To enable a greater incline to be given to the catch-basin, I provide an annular flange $t$, preferably formed integrally upon the exterior of the lower end of the top and intermediate sections and adapted when the catch-basin is assembled to be located between the walls of the adjoining ends of said sections. I prefer to make my sections each of uniform transverse area throughout their depth.

The street-opening $g$ is formed in the flat side of the top section, which carries the deflector $h$ on the interior thereof, near its lower end, and the ends $a$ of said street-opening $g$ are lower than the middle portion thereof to deflect the water, when running slowly into the catch-basin, away from the trap.

The deflector $h$ is preferably cast in one with the top section and is inclined from its middle toward the ends thereof, and from its line of connection to the catch-basin downwardly toward the middle of said catch-basin.

The advantage of placing the deflector a short distance below the street-opening is to cause the water running down the side of the catch-basin to the deflector to constitute a head that will project said water from the edge of the deflector and absolutely prevent it falling therefrom upon or in the vicinity of the trap, and this will result even if the deflector were flat or of other form than shown and said deflector were located a short distance below the street-opening. I prefer, however, to have the angle of incline from the middle of the deflector to the sides thereof greater than the angle of incline from the side that carries the deflector toward the middle of the catch-basin.

The trap consists of a main portion *i* of oblong cross-section completely open at both ends and formed with lateral flanges *j*, by means of which said trap is bolted to the flat side of the bottom section, while the sewer connection *k* is cast in one with said oblong section and projects through an opening *u* in the said flat side of the catch-basin. This construction of the trap enables the complete interior thereof to be scraped and thoroughly cleansed without removing it and a perfectly tight joint therebetween and the catch-basin to be effected, as a gasket *p* can be inserted between the adjoining portions thereof and the trap, and then by the bolts *q* clamped tightly to the catch-basin. The cover *r* of the trap has a tapered flange *s* cast in one therewith to take into the slightly-flared open upper end of the trap, and a rod *v*, connected at its lower end to the cover and extending to within a short distance of the top of the catch-basin, enables said cover to be lifted from its seat.

The advantage in forming the gully of D cross-section throughout its depth is that it presents a flat side to carry the trap, and consequently a greater area at the point of exit from the gully, and, furthermore, that a much greater internal area is obtained than in the gullies the sections whereof are of circular cross-section.

A great advantage attendant upon the above-described construction of the trap is that the cover can be removed and communication from the catch-basin to sewer effected through the top after, as frequently happens in severe weather, this lower end thereof may happen to have been frozen up or clogged with ice.

By constructing catch-basins according to my invention of downwardly-increasing transverse area, the danger of the sections being lifted and the joints broken is obviated, because the natural action of the frost is to lift in a straight vertical line. Consequently any lift along the line of the bottom or any section will clear the section above it, owing to the superimposed sections being offset inwardly from their supporting-sections.

In order to enable my improved catch-basin to be constructed of any desired depth, I make the intermediate section interchangeable with others of different lengths, the uniform diameter of each independent section enabling this to be done.

It is obvious that, if desired, two or more intermediate sections can be used without departing from the spirit of my invention.

What I claim is as follows:

1. A catch-basin comprising an intermediate section, an upper section and a lower section, the intermediate section having one end located in the adjacent end of one of the adjoining sections said intermediate section being of greater transverse area than the upper section and less transverse area than the lower section, and means for supporting said intermediate section at the top of said lower section, substantially as described.

2. A catch-basin comprising a lower section with sewer connection, an upper section with street-opening and an intermediate section having one end located in the adjacent end of one of the adjoining sections said intermediate section being of greater transverse area than said upper section and less transverse area than the lower section, and means for supporting said intermediate section at the top of said lower section, substantially as described.

3. A catch-basin of downwardly-increasing transverse area and comprising a lower section with sewer connection, an upper section with street-opening, and an intermediate section of greater transverse area than the upper section and less transverse area than the lower section and interchangeable with other such intermediate sections of different lengths, substantially as described and for the purpose set forth.

4. A catch-basin comprising a top section *b* of uniform transverse area throughout its depth and having street-opening *g*, an intermediate section *d*, of greater transverse area than said top section and of uniform transverse area throughout its depth and formed with an annular shoulder *e*, for supporting said top section, a bottom section *c* having sewer connection *k* and being of greater transverse area than said intermediate section, and of uniform transverse area throughout its depth and formed with an annular shoulder *e* for supporting said intermediate section; said intermediate section being interchangeable with other intermediate sections of different lengths, substantially as described.

5. The combination with a catch-basin having a street-opening and a sewer connection, of an arched deflector with its arch projecting upwardly said deflector being arranged beneath the street-opening and above the sewer connection, substantially as described and for the purpose set forth.

6. The combination with a catch-basin having a street-opening and sewer connection, of an arched deflector with its arch projecting upwardly said deflector being secured to one side of said catch-basin beneath the street-opening and above the sewer connection and canted downwardly from said side toward the middle of the gully, substantially as described and for the purpose set forth.

7. A catch-basin consisting of a top section, a bottom section and a middle section, all of D cross-section, the top section having the street-opening formed in the flat side thereof near the upper end, the ends of the lower side of said opening being depressed, a deflector a short distance below said street-opening; a trap consisting of a main portion of oblong cross-section vertically arranged and completely open at both ends and having the sewer connection and side flanges cast in one therewith, and a cover for the open upper end of said trap all substantially as described and for the purpose set forth.

In testimony whereof I have affixed my signature in presence of two witnesses.

LEWIS SKAIFE.

Witnesses:
WILLIAM P. McFEAT,
FRED J. SEARS.